US012410905B2

(12) United States Patent
Ju et al.

(10) Patent No.: US 12,410,905 B2
(45) Date of Patent: Sep. 9, 2025

(54) ASSEMBLY STRUCTURE AND LIGHTING DEVICE

(71) Applicant: RADIANT OPTO-ELECTRONICS CORPORATION, Kaohsiung (TW)

(72) Inventors: Chih-Hung Ju, Kaohsiung (TW); Chung-Kuang Chen, Kaohsiung (TW); Pin-Tsung Wang, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/597,031

(22) Filed: Mar. 6, 2024

(65) Prior Publication Data

US 2024/0295308 A1 Sep. 5, 2024

Related U.S. Application Data

(63) Continuation of application No. PCT/CN2023/088089, filed on Apr. 13, 2023.

(30) Foreign Application Priority Data

Mar. 1, 2023 (CN) ......................... 202310184722.6

(51) Int. Cl.
*F21V 19/00* (2006.01)
*F21V 23/00* (2015.01)
*F21Y 115/10* (2016.01)

(52) U.S. Cl.
CPC ........ *F21V 19/0015* (2013.01); *F21V 23/004* (2013.01); *F21V 2200/20* (2015.01); *F21Y 2115/10* (2016.08)

(58) Field of Classification Search
CPC ........................... F21V 19/0015; F21V 23/004
See application file for complete search history.

(56) References Cited

U.S. PATENT DOCUMENTS 9,368,768 B1 * 6/2016 Maglica .............. H01M 10/287
2012/0012721 A1 1/2012 Baier
(Continued)

FOREIGN PATENT DOCUMENTS

CN 102480892 A 5/2012
CN 209977851 U 1/2020
(Continued)

*Primary Examiner* — Christopher E Dunay
(74) *Attorney, Agent, or Firm* — BACON & THOMAS, PLLC

(57) ABSTRACT

A lighting device comprises a first component, a second component, at least one assembling module, at least one light guide plate, and at least one light-emitting unit. The assembling module is mounted at the second component and comprises an elastic element and at two engaging elements, which are moveable along an abutting direction. The elastic element pushes the engaging elements along the abutting direction, such that the engaging elements extend out from the second component and abut against at least one matching portion of the first component along the abutting direction to detachably assemble the second component to the first component along an assembling direction, which is nonparallel to the abutting direction. The at least one light guide plate is mounted at the first component, and the at least one light-emitting unit is mounted at one of the second component and the engaging element of the assembling module and faces the light guide plate.

12 Claims, 12 Drawing Sheets

(56) References Cited

U.S. PATENT DOCUMENTS

| | | | | |
|---|---|---|---|---|
| 2012/0224361 | A1* | 9/2012 | Wang | F21V 23/04 362/208 |
| 2017/0209318 | A1* | 7/2017 | Schroeder | F16M 13/022 |
| 2019/0368700 | A1* | 12/2019 | Ji | A47F 3/001 |
| 2020/0318824 | A1* | 10/2020 | Lee | F21V 19/0015 |
| 2025/0020268 | A1* | 1/2025 | Wang | F16M 11/18 |

FOREIGN PATENT DOCUMENTS

| | | | |
|---|---|---|---|
| CN | 213424504 | U | 6/2021 |
| CN | 213453489 | U | 6/2021 |
| KR | 102023123 | B1 | 9/2019 |
| KR | 20200074533 | A | 6/2020 |
| KR | 20220105223 | A | 7/2022 |
| TW | 201217703 | A | 5/2012 |
| TW | 201908653 | A | 3/2019 |
| TW | I687626 | B | 3/2020 |

* cited by examiner

ASSEMBLY STRUCTURE AND LIGHTING DEVICE

BACKGROUND OF THE INVENTION

1. Field of the Invention

The present invention relates to an assembly structure and a lighting device having the assembly structure, especially to the assembly structure allowing a first component and a second component to be detachably assembled.

2. Description of Related Art

A conventional flat lighting device has a frame, a light guide plate, multiple light-emitting units, a driver, etc. The frame is mounted at the ceiling. The light guide plate and the light-emitting units are mounted in the frame. The driver is mounted at a back side of the light guide plate for driving the light-emitting units to emit light.

When the conventional flat lighting device stops working, it might be because either the light-emitting units or the driver is broken. However, maintenance staffs cannot determine which element causes the malfunction on-site, and the light-emitting units and the driver are hard to be detached from the conventional flat lighting device. Therefore, the on-site maintenance staff has to replace a whole set of the conventional flat lighting device with a new set, and then brings the malfunctioning flat lighting device back for further trouble-shootings to confirm which element causes the malfunction. To demount the whole set of the conventional flat lighting device is inconvenient and time-consuming, and the whole set of the flat lighting device is large in volume and thus hard to be carried. Furthermore, when the conventional flat lighting device malfunctions or is broken, since it is hard to be detached for partial replacement, the common practice is to throw the whole set of the conventional flat lighting device away and replace it with a new one, causing unnecessary wasting, and thus needs to be improved.

SUMMARY OF THE INVENTION

The main objective of the present invention is to provide a lighting device to resolve the high time consumption and inconvenience that when malfunctioning, the whole set of the conventional flat lighting device needs to be detached since the light-emitting units and the driver are hard to be detached.

The lighting device comprises a first component, a second component, at least one assembling module, at least one light guide plate, and at least one light-emitting unit. The first component has at least one matching portion. The at least one assembling module is mounted at the second component and facilitates the second component to be detachably assembled to the first component along an assembling direction. The at least one assembling module comprises two engaging elements and an elastic element, and the two engaging elements are disposed at two sides opposite to each other of the second component along the abutting direction. The at least one engaging element is movably mounted at the second component along an abutting direction. The elastic element is mounted in the second component and disposed between the two engaging elements, and is capable of pushing the two engaging elements along the abutting direction, such that one of the two engaging elements abuts against the at least one matching portion of the first component along the abutting direction to assemble the second component to the first component. The assembling direction and the abutting direction are nonparallel. The at least one light guide plate is mounted at the first component, and the at least one light-emitting unit is mounted at one of the second component and the two engaging elements, and is faced toward the at least one light guide plate.

The at least one assembling module of the assembly structure allows the second component to be detachably assembled with the first component. When the second component extends into the first component along the assembling direction and is adjacent to the at least one matching portion of the first component, the elastic element abuts against the two engaging elements along the abutting direction, so one of the two engaging elements abuts against the at least one matching portion of the first component along the abutting direction to assemble the second component to the first component. Detaching the two engaging elements along a direction opposite to the abutting direction from the at least one matching portion, the second component can be detached.

Each of the two engaging elements is pushed outwardly along the abutting direction by the elastic element, and one of the two engaging elements abuts against the at least one matching portion of the first component, thereby engaging the first and the second components. To quickly detach the second component, by applying a force on each of the two engaging elements to compress the elastic element inwardly along the abutting direction, each of the two engaging elements will no longer abut against the at least one matching portion of the first component. Therefore, the first and the second components will be no longer engaged together, facilitating the next detaching process.

DETAILED DESCRIPTION OF THE PREFERRED EMBODIMENT

Figure 1:
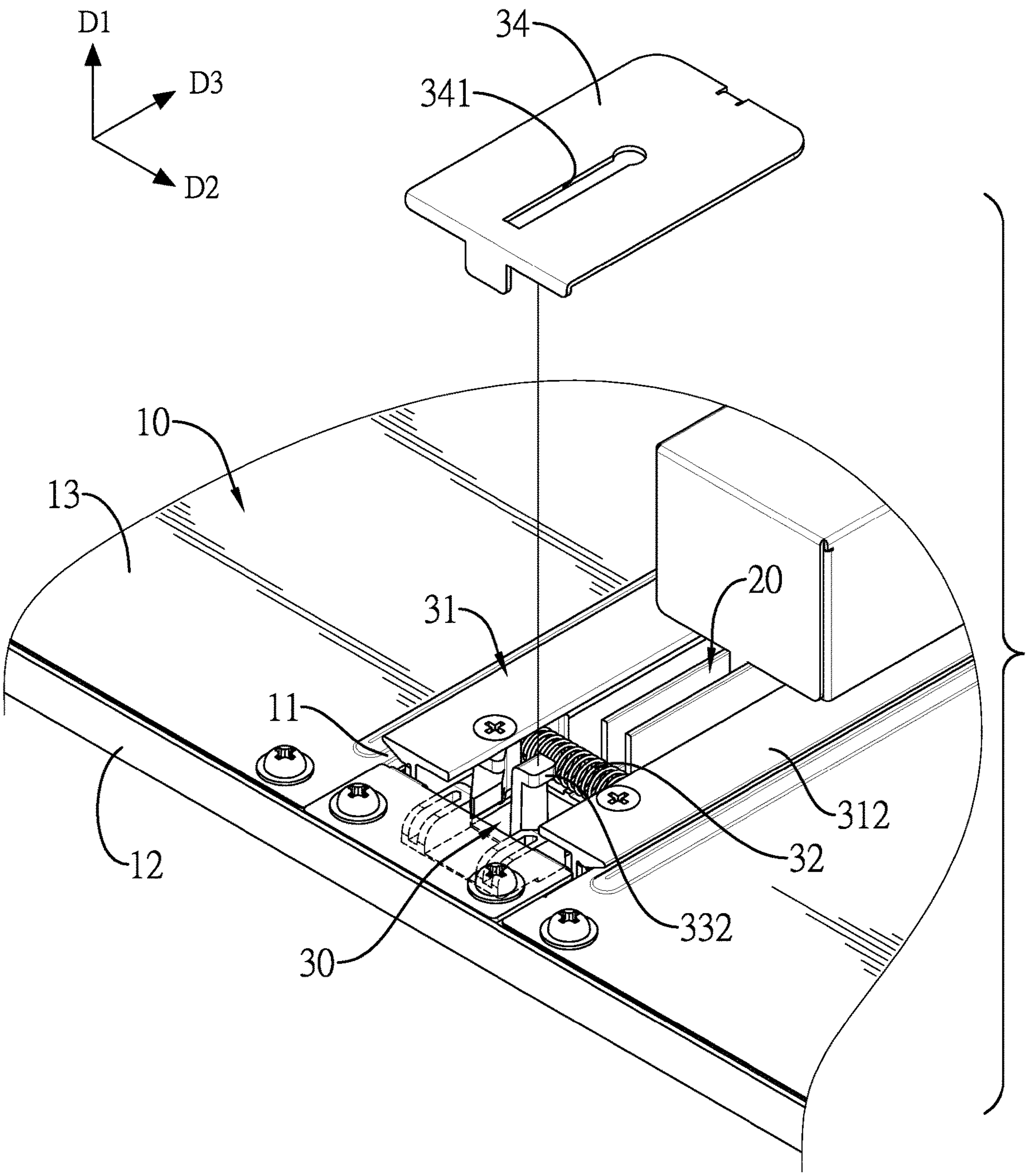
FIG. 1 is an enlarged exploded perspective view of an embodiment of an assembly structure in accordance with the present invention.
Figure 2:
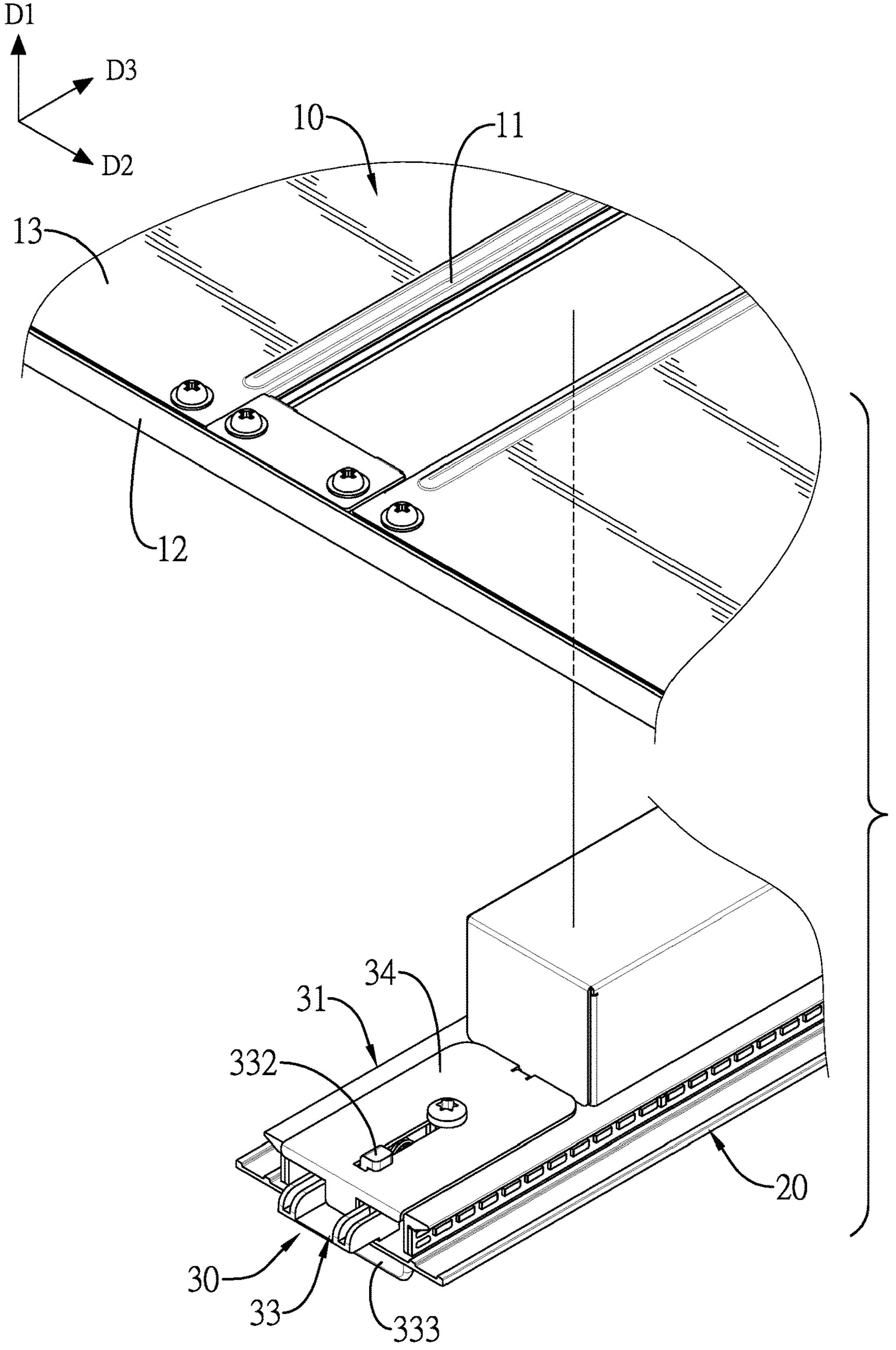
FIG. 2 is another enlarged exploded perspective view of the assembly structure in FIG. 1.

With reference to FIGS. 1 and 2, a preferable embodiment of an assembly structure in accordance with the present invention comprises a first component 10, a second component 20 and at least one assembling module 30.

With reference to FIGS. 1 and 2, the first component 10 has at least one matching portion 11.

Figure 3:
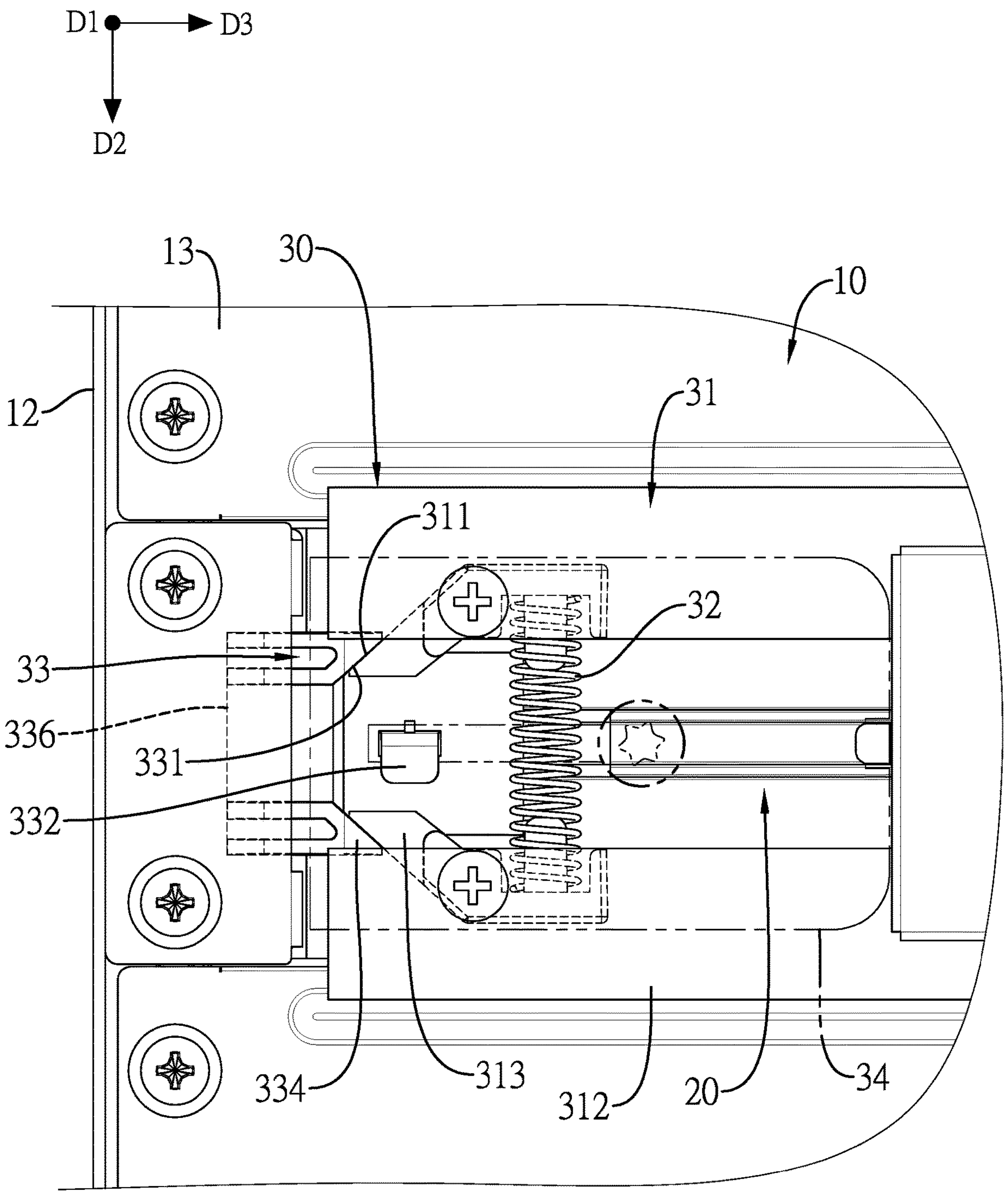
FIG. 3 is an enlarged top view of the assembly structure in FIG. 1, before an actuator is operated.
Figure 4:
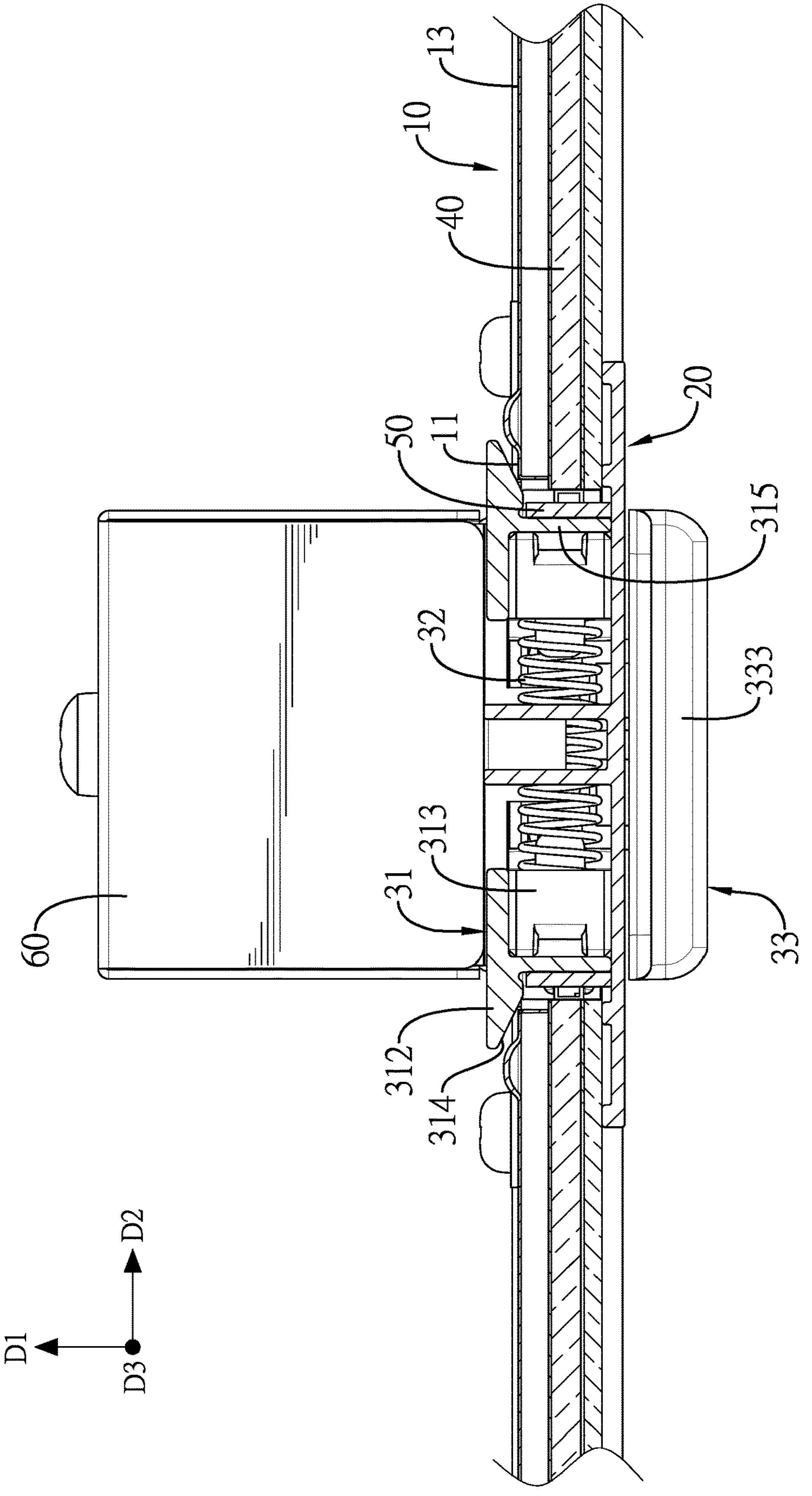
FIG. 4 is a front sectional view of the assembly structure in FIG. 1, when an elastic element is pressed outwardly.

With reference to FIGS. 1 and 2, the at least one assembling module 30 is mounted at the second component 20 and facilitates the second component 20 to be detachably assembled to the first component 10 along an assembling direction D1. With reference to FIGS. 1, 3 and 4, the at least one assembling module 30 comprises at least one engaging element 31 and an elastic element 32. The at least one engaging element 31 is movably and detachably mounted at the second component 20 along an abutting direction D2. The elastic element 32 is mounted in the second component 20 and pushes the at least one engaging element 31 along the abutting direction D2, such that the at least one engaging element 31 abuts against the at least one matching portion 11 of the first component 10 along the abutting direction D2 to assemble the second component 20 to the first component 10. The assembling direction D1 and the abutting direction D2 are nonparallel.

With reference to FIGS. 1 to 3, the at least one assembling module 30 of the assembly structure facilitates the second component 20 to be attached to or detached from the first component 10. When the second component 20 extends into the first component 10 along the assembling direction D1 and is adjacent to the at least one matching portion 11 of the first component 10, the elastic element 32 pushes the at least one engaging element 31 along the abutting direction D2. So, the at least one engaging element 31 abuts against the at least one matching portion 11 of the first component 10 along the abutting direction D2 to assemble the second component 20 to the first component 10. Further, with reference to FIGS. 7 and 8, to quickly detach the first and second components, by forcing the at least one engaging element 31 to compress the elastic element 32 inwardly along the abutting direction D2, the at least one engaging element 31 will be moved away and detached from the at least one matching portion 11. Therefore, the first component 10 and the second component 20 will no longer be fixed and engaged together, and thus the second component 20 can be detached to facilitate the next detaching process. So, the second component 20 can be easily attached to and detached from the first component 10.

Figure 5:
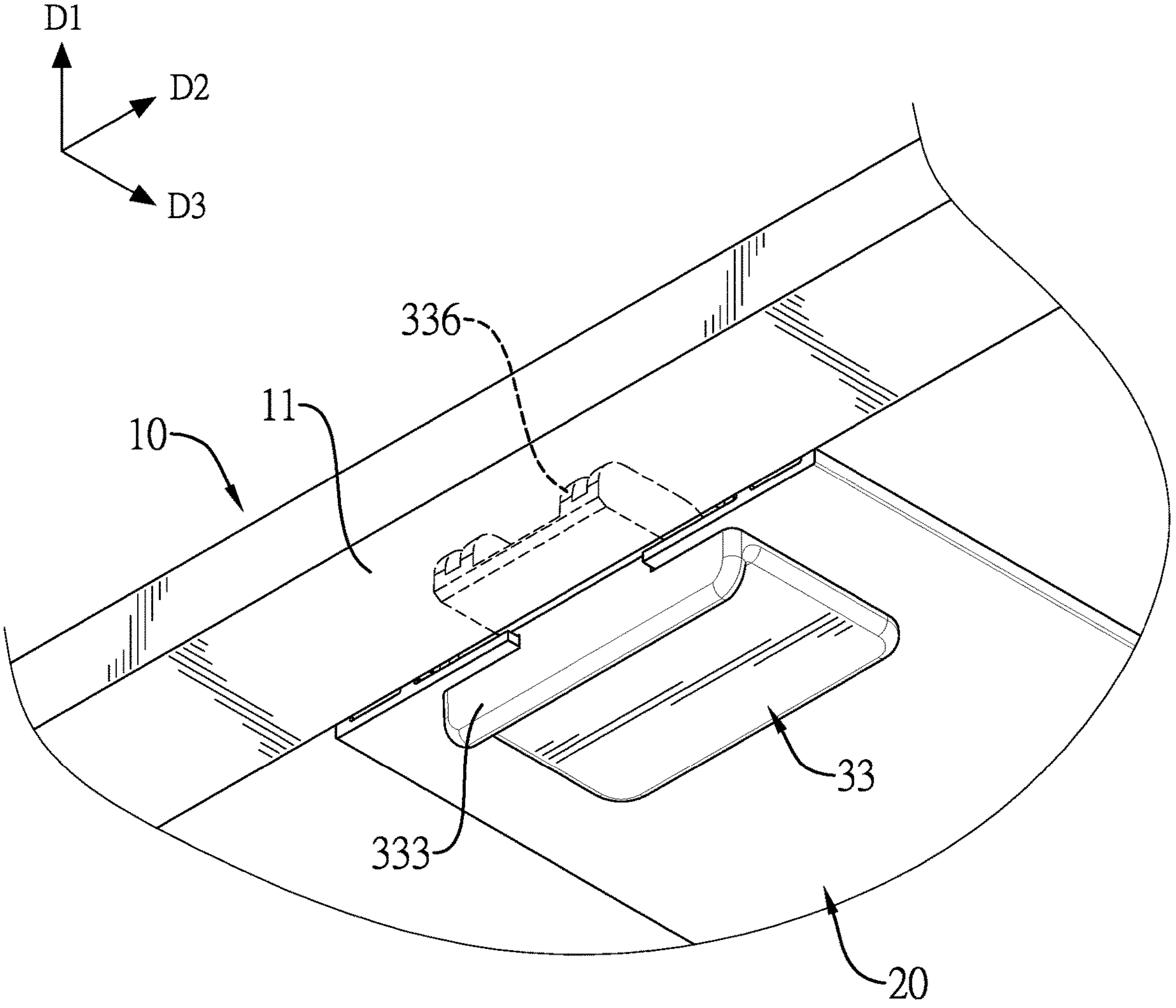
FIG. 5 is an enlarged perspective view of the assembly structure in FIG. 1, before the actuator is operated.
Figure 6:
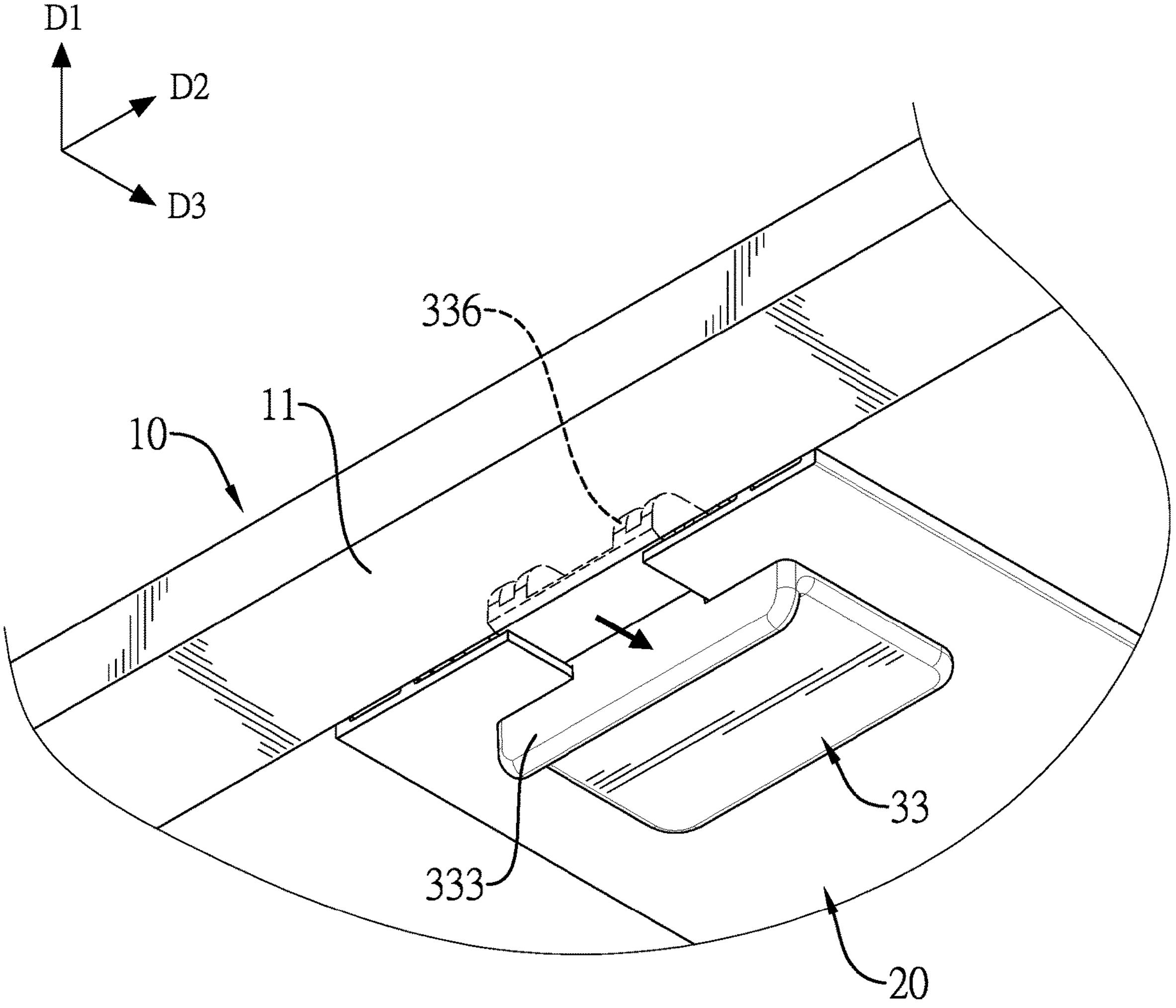
FIG. 6 is an enlarged perspective view of the assembly structure in FIG. 1, after the actuator is operated.
Figure 7:
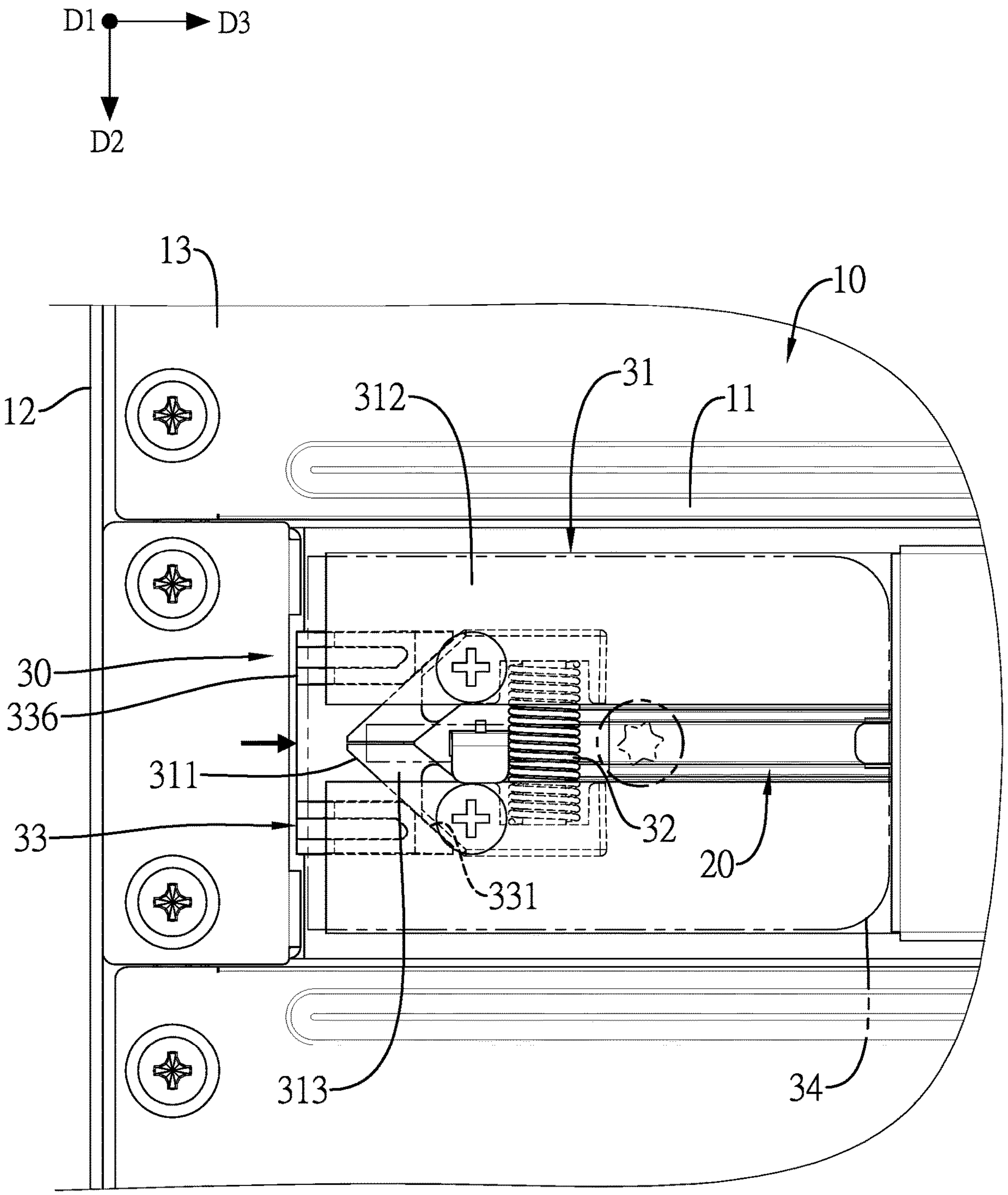
FIG. 7 is an enlarged top operating view of the assembly structure in FIG. 1, after the actuator is operated.

With reference to FIG. 2, to compress the elastic element 32 by operating the engaging element 31 more easily, the at least one assembling module 30 of the embodiment further comprises an actuator 33. The actuator 33 is mounted at the second component 20 and can be operated to move along a force-applying direction D3. As shown in FIGS. 5 to 7, when the actuator 33 is operated to move along the force-applying direction D3, the actuator 33 will push the at least one engaging element 31 to depart from the at least one matching portion 11 along the abutting direction D2. So, the second component 20 can be detached from the first component 10 along a direction, which is opposite to the assembling direction D1. Operating the actuator 33 facilitates moving the at least one engaging element 31 away from the at least one matching portion 11, therefore increasing the convenience of detaching the second component 20. Besides, the assembling direction D1, the abutting direction D2 and the force-applying direction D3 are preferably perpendicular to each other to facilitate ease in manufacturing the assembly structure.

Figure 8:
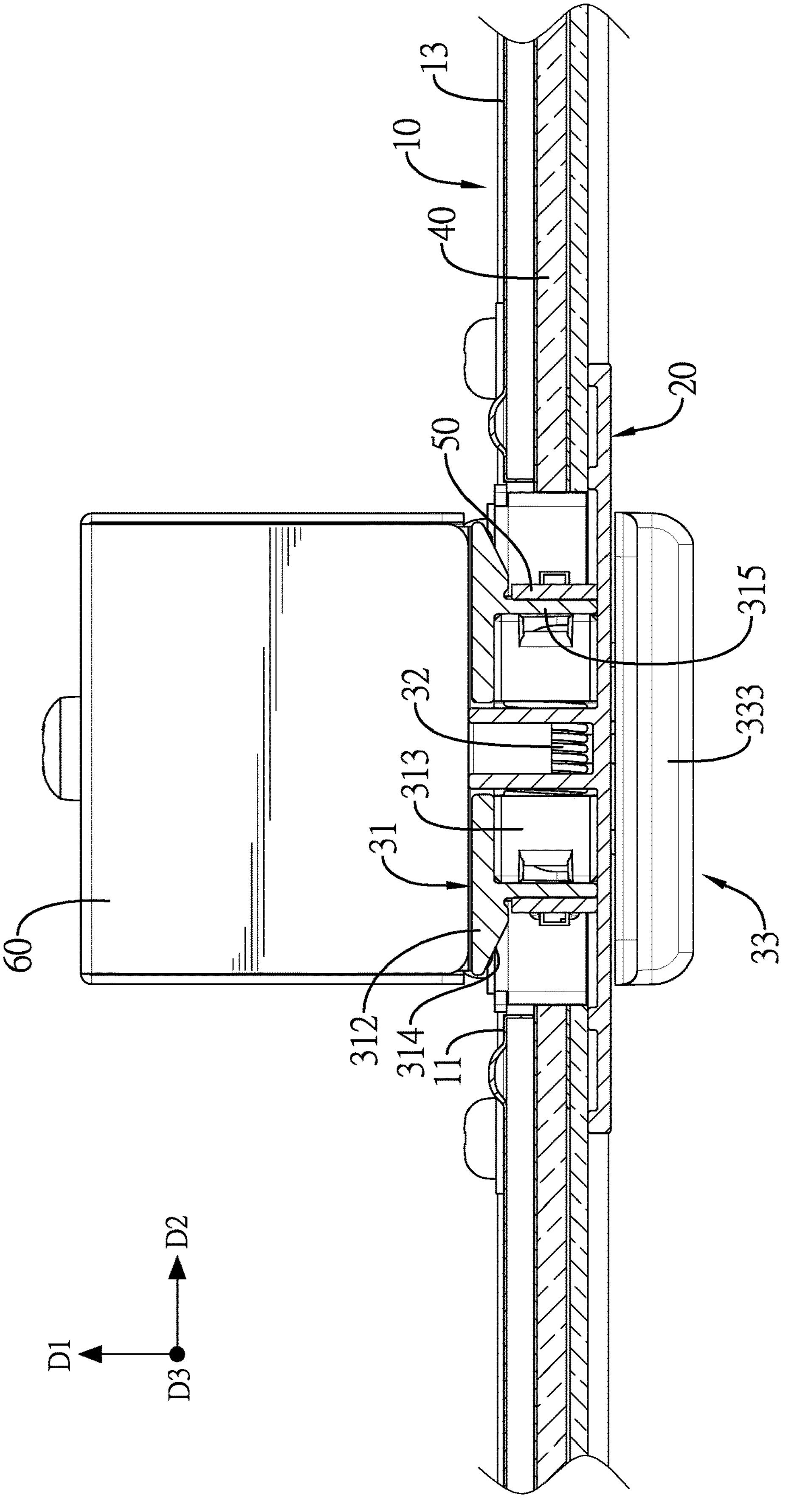
FIG. 8 is a front sectional view of the assembly structure in FIG. 1, when the elastic element is compressed inwardly.

With reference to FIGS. 3, 7 and 8, to smooth the at least one engaging element 31's movement while pushing, the actuator 33 of the embodiment has at least one first guiding inclined surface 331, and the at least one engaging element 31 has a second guiding inclined surface 311. The second guiding inclined surface 311 abuts against the at least one first guiding inclined surface 331. When the actuator 33 is operated to move along the force-applying direction D3, the at least one first guiding inclined surface 331 of the actuator 33 pushes the second guiding inclined surface 311 of the at least one engaging element 31. The at least one first guiding inclined surface 331 and the second guiding inclined surface 311 both incline relative to the force-applying direction D3 and to the abutting direction D2. While the actuator 33 is operated, the at least one first guiding inclined surface 331 of the actuator 33 pushes the second guiding inclined surface 311 of the at least one engaging element 31, thereby guiding the at least one engaging element 31 to smoothly move away from the at least one matching portion 11 along the abutting direction D2 to compress the elastic element 32 inwardly. When the actuator 33 is not operated, the elastic element 32 restores from compression and pushes the at least one engaging element 31 to move toward the at least one matching portion 11. The at least one engaging element 31 then pushes the actuator 33 back to its original position which is prior-to-operation, through the second guiding inclined surface 311, so manually restoring the actuator 33 is unnecessary.

Figure 9:
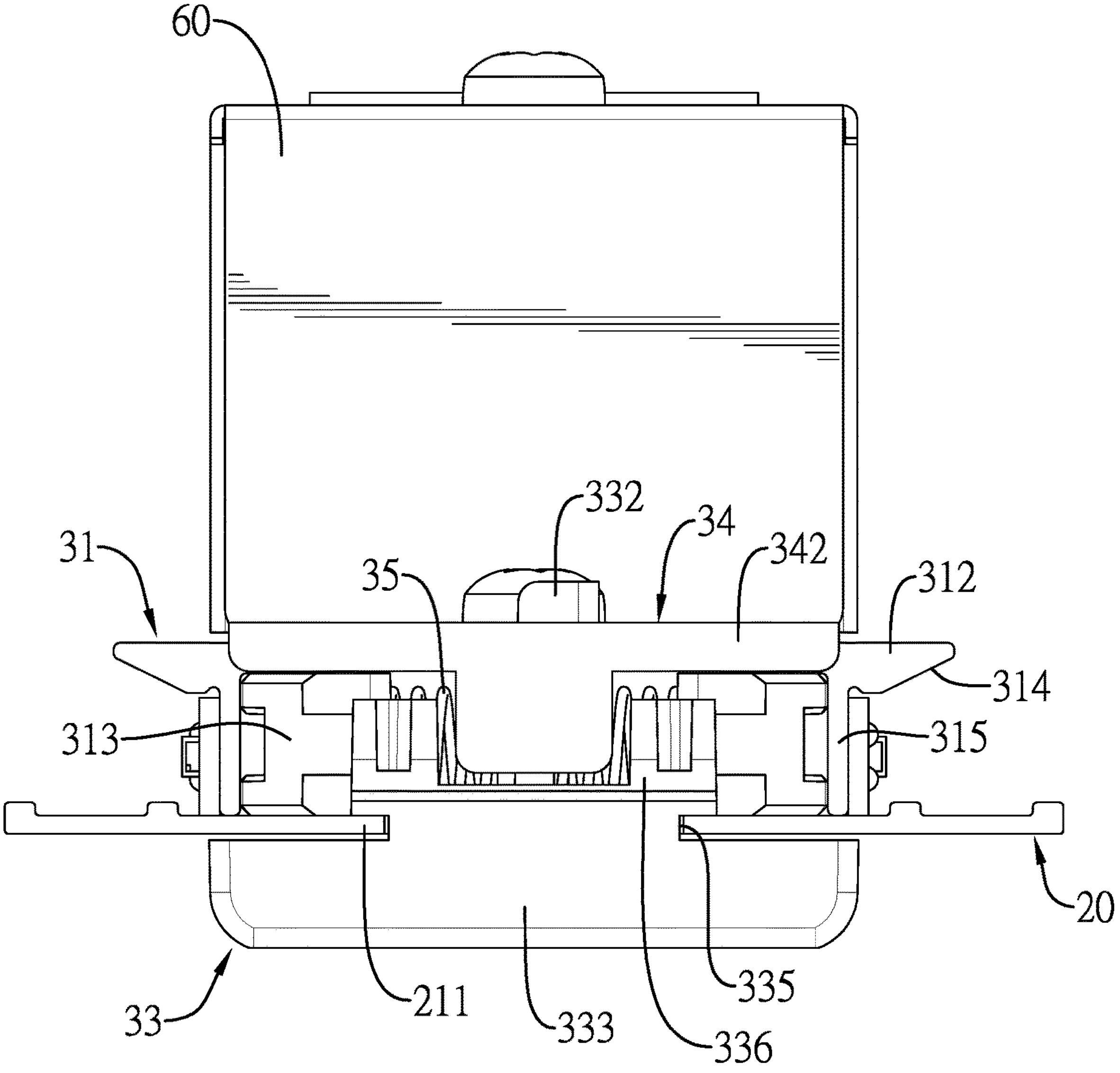
FIG. 9 is a front view of a second component and at least one assembling module of the assembly structure in FIG. 1.

Preferably, as shown in FIGS. 1 and 9, the at least one assembling module 30 comprises a position-limiting plate 34, which is mounted on and covers the second component 20. The at least one engaging element 31 and the elastic element 32 are disposed at an inner side of the position-limiting plate 34. The at least one engaging element 31, the elastic element 32 and the actuator 33 are limited in position along the assembling direction D1 by the position-limiting plate 34 and the second component 20. The position-limiting plate 34 has a position-limiting hole 341 elongated along the force-applying direction D3. The actuator 33 has a position-limiting hook 332, which extends out from the position-limiting hole 341 and abuts against an outer side of the position-limiting plate 34, and therefore the actuator 33 can only be moved along the force-applying direction D3 to keep the operating stability. In addition, the position-limiting plate 34 further has a covering panel 342 elongated inwardly. The covering panel 342 limits the at least one engaging element 31 in position along the force-applying direction D3, thereby increasing operating and installing stabilities of the at least one engaging element 31.

Figure 10:
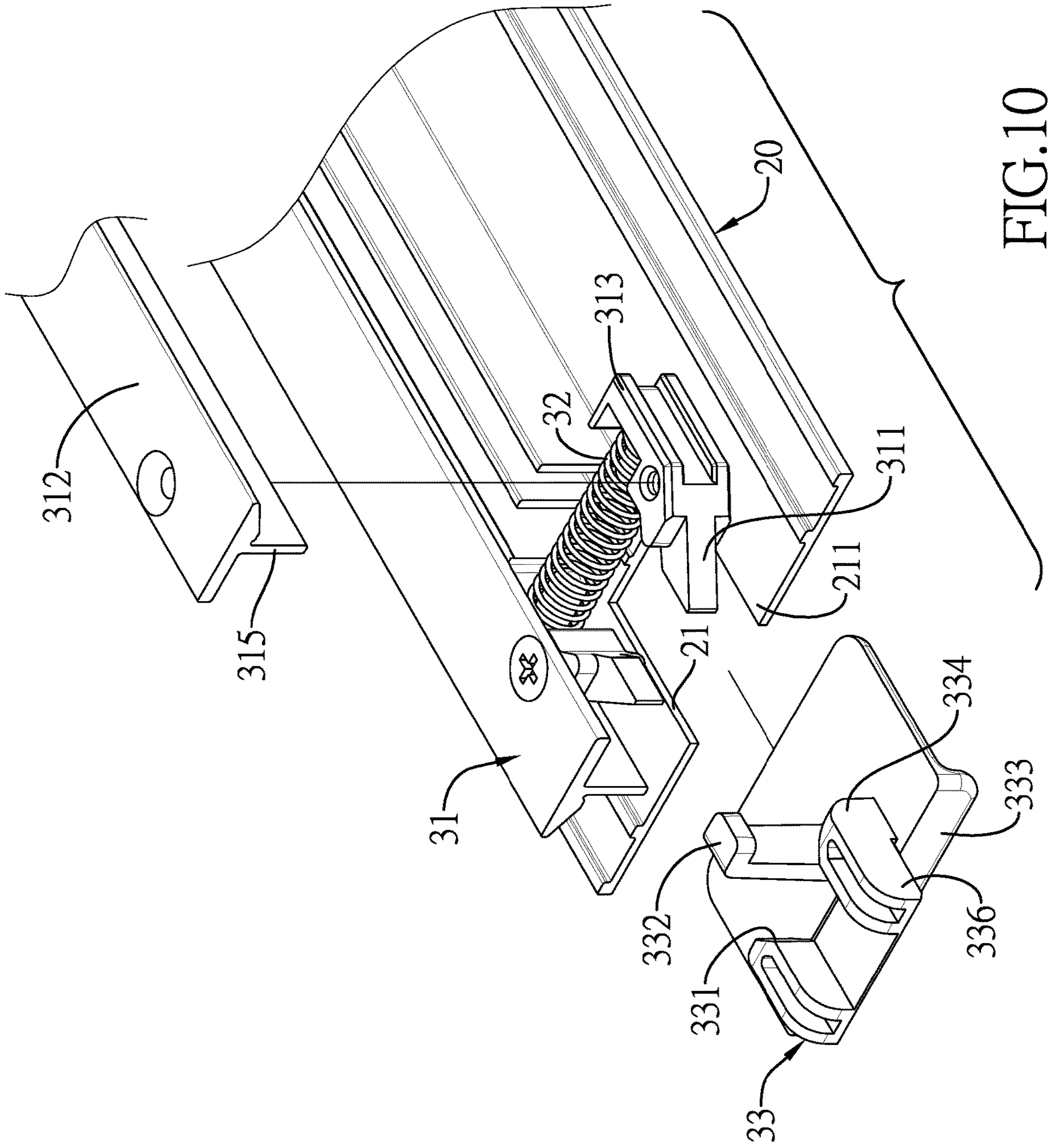
FIG. 10 is an exploded perspective view of the second component and the at least one assembling module of the assembly structure in FIG. 1.

Additionally, with reference to FIGS. 9 and 10, the actuator 33 has a handle 333 and a guiding portion 334. The handle 333 extends out from a bottom side of the second component 20. The guiding portion 334 is disposed in the second component 20. The at least one first guiding inclined surface 331 is formed at the guiding portion 334. The handle 333 facilitates a user to operate the handle 333 from the bottom side of the second component 20, hence enhancing convenience in use. Besides, the second component 20 has an opening hole 21 formed at the bottom side of the second component 20. The handle 333 extends out from the opening hole 21 of the second component 20. The second component 20 has at least one positioning protrusion 211 formed at a periphery of the opening hole 21. The actuator 33 has at least one positioning recess 335 adjacent to the handle 333. The at least one positioning protrusion 211 extends into the at least one positioning recess 335 to limit the actuator in position along the assembling direction D1. Therefore, when the actuator 33 is operated to move along the force-applying direction D3, the actuator 33 will not shift away along the assembling direction D1, so the connecting stability between the actuator 33 and the second component 20 is increased.

Furthermore, with reference to FIGS. 5, 6 and 10, the actuator 33 has a fixing portion 336 extending along the force-applying direction D3 toward the first component 10 and extending into the first component 10 along the force-applying direction D3. That is, the fixing portion 336 is elongated toward a side of the actuator 33 far away from the first guiding inclined surface 331. When the second component 20 is connected to the first component 10, the fixing portion 336 extends into the first component 10, such that the second component 20 is limited in position by both of the at least one engaging element 31 and the fixing portion 336 of the actuator 33 simultaneously. When the actuator 33 is operated and moved along the force-applying direction D3, the fixing portion 336 will be detached from the first component 10. By the fixing portion 336, the connecting stability between the second component 20 and the first component 10 is increased. Furthermore, a top side of the fixing portion 336 forms an arched edge, which can guide the fixing portion 336, so the fixing portion 336 extends into the first component 10 more easily, thereby helping the second component 20 to be positioned and connected to the first component 10.

As shown in FIG. 10, the at least one engaging element 31 has an engaging chunk 312 and a guiding chunk 313. The engaging chunk 312 is elongated along the force-applying direction D3 and abuts against the at least one matching portion 11 of the first component 10. The guiding chunk 313 is mounted at the engaging chunk 312. The second guiding inclined surface 311 is formed at the guiding chunk 313. The engaging chunk 312 and the guiding chunk 313 can be one-piece formed or be two separate units that are assembled together. Preferably, as shown in FIG. 8, the engaging chunk 312 has a chunk guiding surface 314, which is elongated along the force-applying direction D3 and inclines with respect to the assembling direction D1. The chunk guiding surface 314 abuts against the at least one matching portion 11 of the first component 10. While assembling the second component 20 to the first component 10, the chunk guiding surface 314 of the engaging chunk 312 guides the second component 20 to a stable assembling position such that the at least one engaging element 31 actually abuts against the at least one matching portion 11 of the first component 10, thereby increasing the connecting stability between the first component 10 and the second component 20.

In an embodiment of the assembly structure in accordance with the present invention, with reference to FIG. 3, the first component 10 has two said matching portions 11, and the at least one assembling module 30 comprises two said engaging elements 31. The two engaging elements 31 are arranged oppositely, each corresponding to a respective one of the two matching portions 11. The elastic element 32 is mounted between the two engaging elements 31 and is capable of pushing the two engaging elements 31. When the at least one assembling module 30 and the second component 20 are assembled to the first component 10, the at least one assembling module 30 is disposed between the two matching portions 11, so each of the two engaging elements 31 is pushed by one end of the elastic element 32 to abut against the corresponding matching portion 11. The actuator 33 has two said first guiding inclined surfaces 331, each corresponding to the second guiding inclined surface 311 of a respective one of the two engaging elements 31; hence, operating the actuator 33 will push the two engaging elements 31 simultaneously. Alternatively, in another embodiment of the assembly structure in accordance with the present invention, the at least one assembling module 30 comprises only one said engaging element 31. One of two sides of the second component 20 along the abutting direction D2 is assembled to the first component 10 through the engaging element 31, and the other side of the second component 20 is assembled to the matching portion 11 of the first component 10 by tenoning. In either embodiment, the second embodiment can be easily attached to and detached from the first component 10.

Additionally, in a configuration of the assembly structure, the assembly structure comprises two said assembling modules 30. The two assembling modules 30 are disposed at two opposite sides of the second component 20, and the actuator 33 of each of the two assembling modules 30 can be operated to move toward a center of the second component 20. That is, the force-applying directions D3 of the two assembling modules 30 are opposite to each other. The at least one engaging element 31 of each of the two assembling modules 30 corresponds to the at least one matching portion 11 of the first component 10 one to one. Alternatively, the engaging elements 31 of the two assembling modules 30 are disposed at one side of the second component 20 along the abutting direction D2, and therefore the engaging elements 31 of the two assembling modules 30 together cooperate with the at least one matching portion 11 of one side of the first component 10. Alternatively, the engaging elements 31 of the two assembling modules 30 connect together in one piece, are abutted by the elastic elements 32 of the two assembling modules 30, and are pushed by the actuators 33 of the two assembling modules 30, hence increasing stabilities of operating the at least one engaging element and stabilities of connecting the second component 20 and the first component 10. Alternatively, in another configuration of the assembly structure, the assembly structure comprises only one said assembling module 30. The assembling module 30 is disposed at one of two ends, opposite to each other along the force-applying direction D3, of the second component 20. The other one of the two ends of the second component 20 is assembled to the first component 10 by tenoning, or has no extra fixing structure so the second component 20 is assembled to the first component 10 only through the assembling module 30, thereby decreasing costs.

Figure 11:
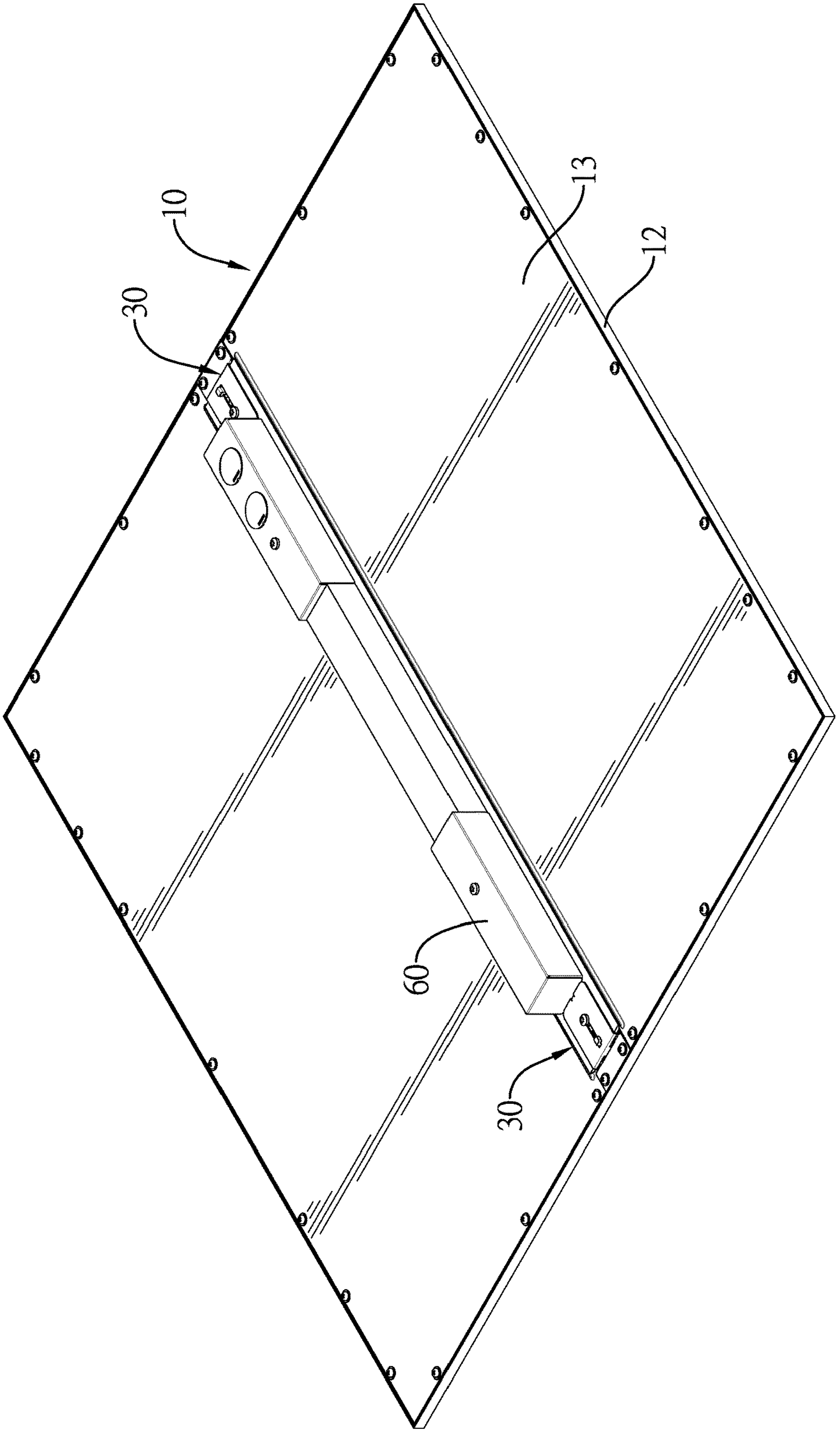
FIG. 11 is a perspective view of an embodiment of a lighting device in accordance with the present invention.

Specifically, the assembly structure is used in fields of lighting devices described as follows. With reference to FIGS. 4 and 11, an embodiment of a lighting device in accordance with the present invention comprises said assembly structure, at least one light guide plate 40 and at least one light-emitting unit 50.

With reference to FIG. 4, the at least one light guide plate 40 is mounted at the first component 10. The at least one light-emitting unit 50 is mounted at the second component 20 or at the at least one engaging element 31 of the at least one assembling module 30 and faces toward the at least one light guide plate 40. Besides, the at least one light-emitting unit 50 can be a light bar with multiple light emitting diodes (LED), or it can be a single light emitting diode depending on product requirements.

In addition, the lighting device comprises a driver 60, which is mounted at the second component 20. The driver 60 is electrically connected to the at least one light-emitting unit 50 to power the at least one light-emitting unit 50.

Preferably, the driver 60 is mounted at a top side of the second component 20 to facilitate to connect to an external power source.

Figure 12:
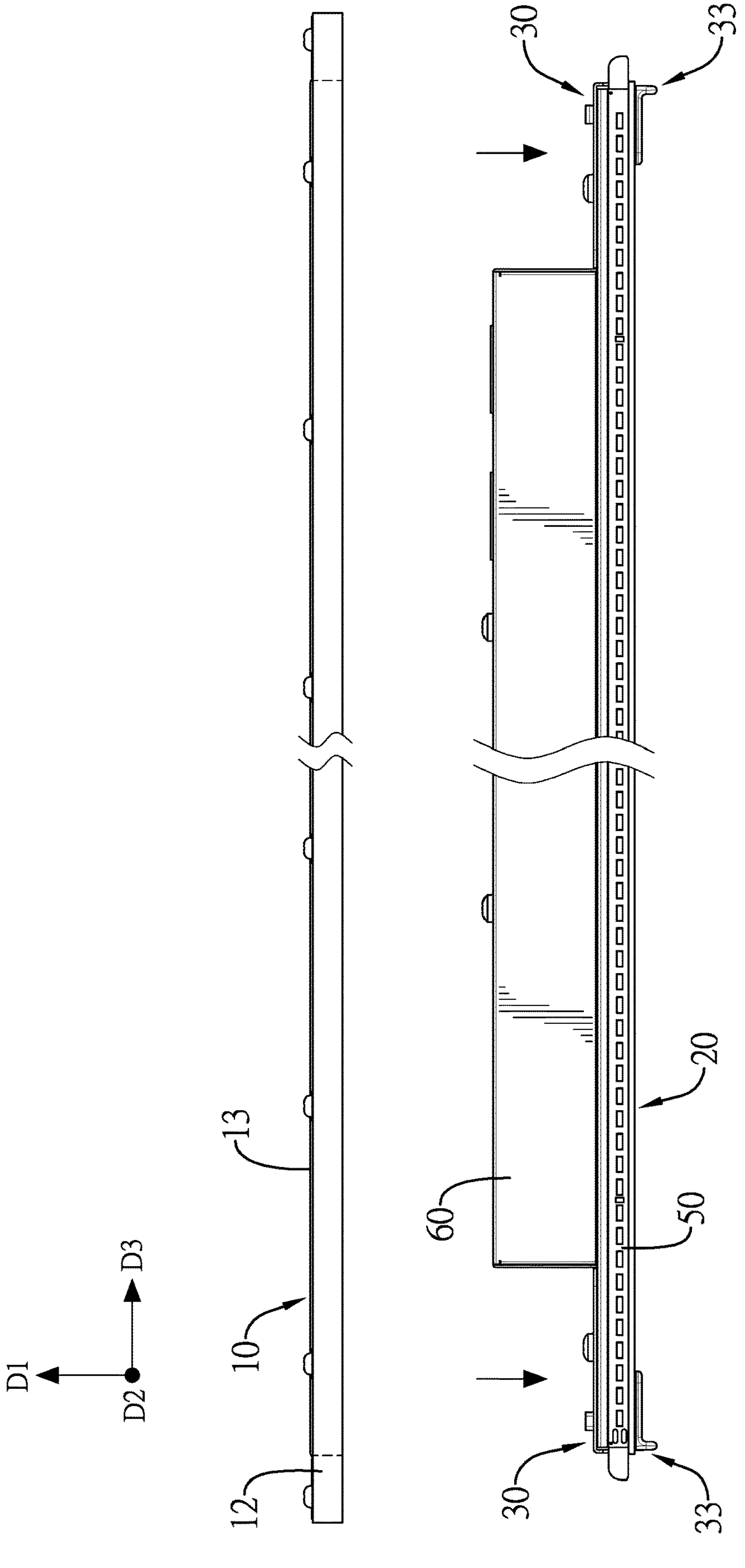
FIG. 12 depicts the lighting device in FIG. 11, wherein the second component, the at least one assembling module, at least one light-emitting unit and a driver are detached from a first component.

With reference to FIGS. 11 and 12, the first component 10 is a frame of the lighting device or is formed on or mounted at the frame of the lighting device. The driver 60 of the lighting device is mounted on the second component 20. The second component 20 and the at least one assembling module 30 can be easily attached to or detached from the first component 10, and the at least one light-emitting unit 50 and the driver 60 can be quickly attached to or detached from the frame of the lighting device. As the first component 10 and the at least one light guide plate 40 stay at their original positions without detaching, the convenience of assembling is increased effectively and the time of assembling is decreased. Transporting a whole set of the lighting device is unnecessary, therefore enhancing the transporting convenience. Also, since the at least one light-emitting unit 50 and the driver 60 can be detached and replaced individually, the first component 10 and the at least one light guide plate 40, which are less likely to be damaged, can continue to be used. The second component 20 and the at least one assembling module 30 can also be reused. Hence the service life of the lighting device is prolonged and the waste is reduced, increasing recycling rates.

In an embodiment of the lighting device, the first component 10 comprises an exterior frame 12 and at least one back plate 13. The at least one back plate 13 and the at least one light guide plate 40 are mounted in the exterior frame 12. The at least one back plate 13 is disposed on a top side of the at least one light guide plate 40. The at least one matching portion 11 is formed at the at least one back plate 13. When the second component 20, the at least one assembling module 30, the at least one light-emitting unit 50 and the driver 60 are detached from the first component 10, the exterior frame 12, the at least one back plate 13 and the at least one light guide plate 40 remain in their original assembling positions without being detached. The detachable components have much smaller volumes compared to non-detachable components, and therefore, on-site maintenance staffs can carry several sets of the detachable components to replace broken lighting devices, thereby increasing convenience.

Additionally, because the second component 20 is assembled to the at least one back plate 13 mainly by the at least one engaging element 31 of the at least one assembling module 30, and because the at least one light-emitting unit 50 is not mounted at the exterior frame 12, the exterior frame 12 achieves a super narrow bezel design, thereby enlarging a light-emitting area of the lighting device. Furthermore, when the second component 20 is connected to the first component 10, the fixing portion 336 of the actuator 33 extends into the exterior frame 12 of the first component 10 along the force-applying direction D3. The at least one engaging element 31 abuts against a top side of the at least one back plate 13 of the first component 10, and the second component 20 abuts against a bottom side of the at least one back plate 13. So, the second component 20 is simultaneously engaged and fixed by the fixing portion 336 of the actuator 33 and the at least one engaging element 31. When detaching the detachable components, pushing the actuator 33 along the force-applying direction D3 allows for detaching the fixing portion 336 of the actuator 33 from the exterior frame 12. At the same time, the at least one engaging element 31 is retrieved inwardly to be moved away from the at least one matching portion 11 on the at least one back plate 13. Therefore, the second component 20 is detached from a bottom side of the first component 10 along the assembling direction D1, so the second component 20 and the driver 60, which is on the second component 20, can be quickly detached.

With reference to FIG. 4, the at least one engaging element 31 has an installing chunk 315. The installing chunk 315 extends along the force-applying direction D3, is parallel to a lateral edge of the at least one light guide plate 40, and is adjacent to the lateral edge of the at least one light guide plate 40. The at least one light-emitting unit is preferably mounted at the installing chunk 315 of the at least one engaging element 31. Since the at least one engaging element 31 is pushed by the elastic element 32, the installing chunk 315 of the at least one engaging element 31 is pushed toward the lateral edge of the at least one light guide plate 40 along the abutting direction D2. Thus, the at least one light-emitting unit 50 mounted at the installing chunk 315 is directly contacted with the lateral edge of the corresponding light guide plate 40. Therefore, the at least one light-emitting unit 50 directly emits light into the corresponding light guide plate 40, effectively increasing the light-coupling effect and the light utilization rate.

Moreover, if the at least one light guide plate 40 expands or shrinks due to temperature, by the elastic element 32 pushing outwardly along the abutting direction D2, a gap between the at least one light-emitting unit 50 and the at least one light guide plate 40 automatically reduces. Therefore, the at least one light-emitting unit 50 is still directly contacted with the corresponding light guide plate 40, so the at least one light-emitting unit 50 and its corresponding light guide plate 40 will not shift away from each other. In turn, an angle of light-coupling remains unchanged, thereby keeping the light-coupling effect of the at least one light-emitting unit 50 and its corresponding light guide plate 40. So, the light utilization rate of the lighting device will not be affected by the expansion or shrinkage of the at least one light guide plate 40 and thus has a higher brightness.

Furthermore, in a configuration of the lighting device comprising only one said light guide plate 40, the at least one assembling module 30 comprises only one said engaging element 31 and uses the engaging element 31 to push the at least one light-emitting unit 50 to be pressed tightly against its corresponding light guide plate 40. In a configuration of the lighting device comprising two said light guide plates 40, the at least one assembling module 30 comprises two said engaging elements 31. The at least one light-emitting unit 50 is mounted at each of the two engaging elements 31, which push the at least one light-emitting unit 50 toward its corresponding light guide plate 40. Symmetrical design of the two engaging elements 31 achieves better connecting stability.

Therefore, responding to market trends, the lighting device is applicable to the Lighting as a Service (LaaS) business model. For example, the operation and power-supply of the lighting device is monitored through the Internet of things any time and can be promptly repaired once malfunctioning is inspected. The replaced light device is directly recycled and reused by the manufacturer. On the contrary, replacing and discarding a whole set of the broken lighting device will produce a lot of wastes. Therefore, by the lighting device in accordance with the present invention, the manufacturers can move the prone-to-broken driver 60 from inside of the lighting device (i.e. the first component 10), to components (i.e. the second component 20 and the at least one assembling module 30), which are easily detachable from the lighting device. Therefore, the driver 60 can be replaced solely without discarding the whole set of the lighting device when broken, thereby prolonging the service life of the lighting device and decreasing the number of abandoned lighting devices that need to be disposed of.

To sum up, the at least one assembling module 30 of the assembly structure makes the second component 20 easily detached from or attached to the first component 10. When the at least one assembling module 30 is applied in the fields of lighting devices, the second component 20 and the driver 60, which is mounted at the second component 20, are easy to be detached, while the first component 10 and the at least one light guide plate 40 are not to be detached. Therefore, the assembly structure not only enhances the convenience of maintaining the lighting device, but also facilitates to transport and reduces wastes.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lighting device comprising:

a first component having at least one matching portion;

a second component;

at least one assembling module mounted at the second component and facilitating the second component to be detachably assembled to the first component along an assembling direction, and comprising two engaging elements movably mounted at the second component along an abutting direction, and wherein the two engaging elements are disposed at two sides opposite to each other of the second component along the abutting direction; and an elastic element mounted in the second component and disposed between the two engaging elements, and capable of pushing the two engaging elements along the abutting direction, such that one of the two engaging elements abuts against the at least one matching portion of the first component along the abutting direction to assemble the second component to the first component;

wherein the assembling direction and the abutting direction are nonparallel;

at least one light guide plate mounted at the first component; and at least one light-emitting unit mounted at one of the second component and the two engaging elements, and faced toward the at least one light guide plate.

2. The lighting device as claimed in claim 1, wherein the at least one assembling module comprises an actuator mounted at the second component and being movable along a force-applying direction, wherein when the actuator is operated to move along the force-applying direction, the actuator pushes one of the two engaging elements to depart from the at least one matching portion along the abutting direction, such that the second component is detachable from the first component along a direction being opposite to the assembling direction.

3. The lighting device as claimed in claim 2, wherein the at least one assembling module comprises a position-limiting plate mounted on the second component and covering the second component;

the two engaging elements and the elastic element are disposed at an inner side of the position-limiting plate;

the position-limiting plate has a position-limiting hole elongated along the force-applying direction; and the actuator has a position-limiting hook extending out from the position-limiting hole and abutting against an outer side of the position-limiting plate.

4. The lighting device as claimed in claim 2, wherein the actuator has at least one first guiding inclined surface;

each of the two engaging elements has a second guiding inclined surface abutting against the at least one first guiding inclined surface;

wherein when the actuator is operated to move along the force-applying direction, the at least one first guiding inclined surface of the actuator pushes the second guiding inclined surface of one of the two engaging elements.

5. The lighting device as claimed in claim 4, wherein the actuator has a handle extending out from a bottom side of the second component; and a guiding portion disposed in the second component; and the at least one first guiding inclined surface is formed at the guiding portion.

6. The lighting device as claimed in claim 5, wherein the second component has an opening hole formed at the bottom side of the second component; and at least one positioning protrusion formed at a periphery of the opening hole;

the handle extends out from the opening hole of the second component;

the actuator has at least one positioning recess adjacent to the handle; and the at least one positioning protrusion extends into the at least one positioning recess to limit the actuator in position along the assembling direction.

7. The lighting device as claimed in claim 4, wherein one of the two engaging elements has an engaging chunk elongated along the force-applying direction and abutting against the at least one matching portion of the first component;

a guiding chunk mounted at the engaging chunk; and the second guiding inclined surface is formed at the guiding chunk.

8. The lighting device as claimed in claim 7, wherein the engaging chunk has a chunk guiding surface elongated along the force-applying direction, inclined with respect to the assembling direction, and abutting against the at least one matching portion of the first component.

9. The lighting device as claimed in claim 2, wherein the actuator has a fixing portion extending along the force-applying direction toward the first component, such that the second component is limited in position by one of the two engaging elements abutting against the at least one matching portion of the first component along the abutting direction and is limited in position by the fixing portion of the actuator extending into the first component along the force-applying direction.

10. The lighting device as claimed in claim 1, wherein the lighting device comprises:

a driver mounted at the second component.

11. The lighting device as claimed in claim 1, wherein the first component comprises:

an exterior frame; and at least one back plate disposed on a top side of the at least one light guide plate;

the at least one back plate and the at least one light guide plate are mounted in the exterior frame; and the at least one matching portion is formed at the at least one back plate.

12. The lighting device as claimed in claim 1, wherein each of the two engaging elements has an installing chunk extending substantially parallel to a lateral edge of the at least one light guide plate and being adjacent to the lateral edge of the at least one light guide plate; and the at least one light-emitting unit is mounted at the installing chunk of one of the two engaging elements.

* * * * *